United States Patent [19]

Koda

[11] 4,424,832

[45] Jan. 10, 1984

[54] PINCH VALVE

[76] Inventor: Kazutoshi Koda, c/o Danrei Co. Ltd., Osakasangyo Bldg. 10-2, Shinmachi 1-chome, Nishi-ku, Japan

[21] Appl. No.: 267,278

[22] Filed: May 26, 1981

[30] Foreign Application Priority Data

Jun. 18, 1980 [JP] Japan ................................ 55-83340

[51] Int. Cl.³ .............................................. F16L 11/00
[52] U.S. Cl. ....................................... 137/844; 251/4; 251/9
[58] Field of Search ................... 251/4, 7, 8, 9, 10, 251/342, 5, 6; 138/45; 137/847, 844

[56] References Cited

U.S. PATENT DOCUMENTS

| 2,371,434 | 3/1945 | Eppler | 251/7 |
| 2,572,658 | 10/1951 | Perkins | 251/9 |
| 3,770,023 | 11/1973 | Rink | 251/8 |
| 3,836,057 | 9/1974 | MacManus | 251/9 |
| 4,275,761 | 6/1981 | Waldhauser | 251/9 |

FOREIGN PATENT DOCUMENTS

| 884441 | 6/1953 | Fed. Rep. of Germany | 251/4 |
| 1193468 | 11/1959 | France | 251/8 |
| 268933 | 9/1950 | Switzerland | 251/9 |
| 412424 | 5/1972 | U.S.S.R. | 251/9 |

Primary Examiner—H. Jay Spiegel
Attorney, Agent, or Firm—Griffin, Branigan & Butler

[57] ABSTRACT

Various embodiments of pinch valves include an annular rib 5 formed on the inner walls of an elastic tube 4. The annular rib 5 is obliquely oriented in the elastic tube 4 and permits passage of fluid therethrough when the tube 4 is not deformed. Upon selective deformation of the tube 4 by choking means 6,7, the annular rib 5 prevents passage of fluid through the tube 4.

13 Claims, 11 Drawing Figures

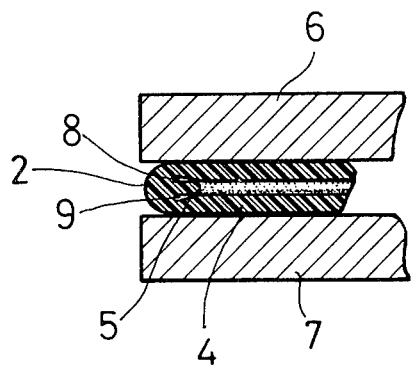
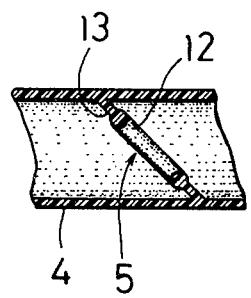
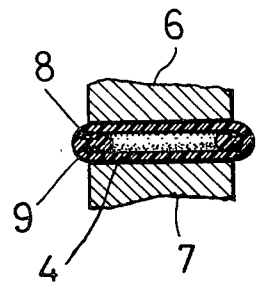
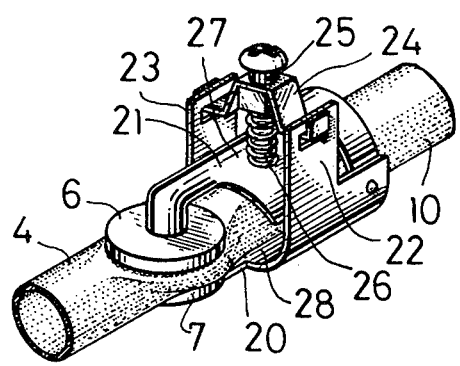
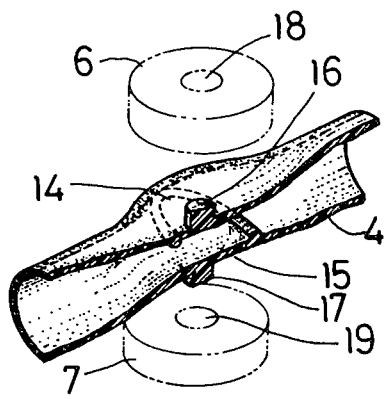

PINCH VALVE

BACKGROUND OF THE INVENTION

This invention pertains to valve mechanisms, and particularly to pinch valves.

Although pinch valves have generally been known as a relatively inexpensive type of valve mechanism, pinch valves are primarily used only for a few rather select purposes. Unfortunately, prior art pinch valves do not lend themselves to many practical applications.

As shown in FIG. 1, a typical pinch valve comprises an elastic tube (comprised of rubber or plastic, for example) which forms a passage for the flow of fluid therethrough and a choking device which shuts the passage of fluid in the elastic tube when the tube is compressed.

FIG. 2 shows an enlarged section of a bending corner portion 2 occuring at one side of a compressed tube. At the inner surface of the bending corner 2 a small hollow 1 still remains. The hollow 1 permits an undesirable leakage of fluid through the tube. It is difficult to totally eliminate the small hollows 1 which occur on both sides of the tube. In this respect, if a very large stress is applied to the elastic tube in an attempt to eliminate the hollows, permanent distortions or cracks may occur at the bending corners 2 or 3 of the elastic tube and may impair the endurance of the pinch valve.

In view of the above, pinch valves have been conventionally used primarily in connection with low pressure fluids under conditions in which some leakage of fluid is tolerable. Some prior art pinch valves, however, have been fabricated to include an elastic tube having a cross-section of special shape. Although pinch valves of this type are durable and have less leakage, such valves require a very thick elastic tube and a strong force to compress the tube and shut the passage.

Therefore an object of this invention is to provide a pinch valve which has high sealing performance.

An advantage of the invention is to provide an inexpensive pinch valve which can be fully operated by a small pressing force.

Another advantage of the invention is to provide a pinch valve which has a broad range of applications.

SUMMARY

Various embodiments of pinch valves include an annular rib formed on the inner walls of an elastic tube. The annular rib is obliquely oriented in the elastic tube and permits passage of fluid therethrough when the tube is not deformed. Upon selective deformation of the tube by choking means, the annular rib prevents passage of fluid through the tube.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 7 is an enlarged sectional end view showing a bending corner portion of an elastic tube;

FIG. 8 is a vertical sectional side view of an elastic tube of another embodiment;

FIG. 9 is a vertical sectional end view of FIG. 8;

FIG. 10 is a perspective view of an embodiment of a valve of the invention used as a safety valve; and, FIG. 11 is a perspective section of another embodiment showing a tube partly broken away.

DETAILED DESCRIPTION OF THE DRAWINGS

In the embodiment of FIGS. 4, 5, 6 and 7, a pinch valve includes an elastic tube 4. An annular rib 5 is formed in the tube 4 to extend from a top inner surface or wall of the elastic tube to a bottom inner surface or wall of the tube. From above (FIG. 5), the rib 5 appears substantially as a circular or elliptical ring or toroid. As seen from the side (FIG. 4), rib 5 appears as a substantially oblique straight line.

The pinch valve of the embodiment of FIGS. 4 through 7 comprises the elastic tube 4 with the abovedescribed slant rib 5 together with two pressing members 6 and 7. Pressing members 6 and 7 are selectively moved upwardly or downwardly onto the tube 4 as part of a choking device (not illustrated). When the pressing members 6 and 7 press the elastic tube with a proper pressure, the elastic tube 4 is temporarily distorted to choke the passage of fluid therethrough.

Figure 1:
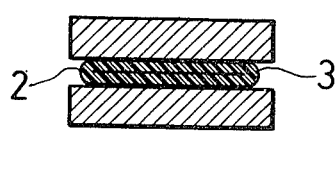
FIG. 1 is a sectional end view of a main portion of a conventional pinch valve.
Figure 4:
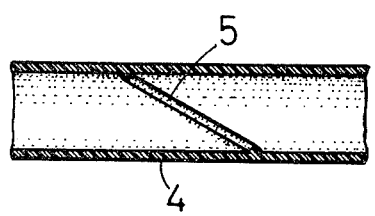
FIG. 4 is a sectional side view of FIG. 3.
Figure 2:
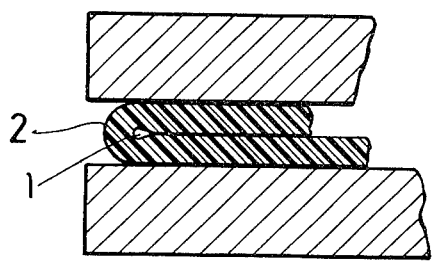
FIG. 2 is an enlarged sectional view of a part of the pinch valve shown in FIG. 1.
Figure 5:
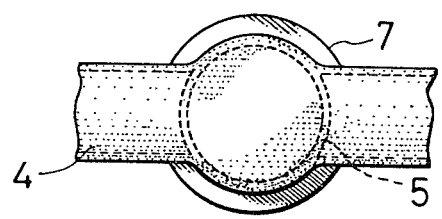
FIG. 5 is a plan view of an embodiment of the invention, wherein an elastic tube is pressed in a closed state but wherein an upper pressing member is not shown to avoid concealing the pressed elastic tube.
Figure 3:
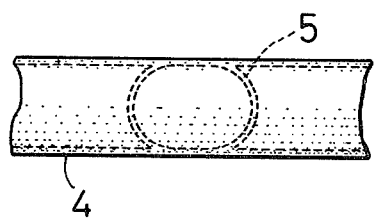
FIG. 3 is a plan view of an elastic tube used in an embodiment of the invention.
Figure 6:
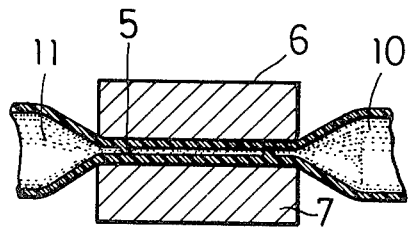
FIG. 6 is a sectional side view of the embodiment shown in FIG. 5.

In the above respect, the plan view and the sectional side view of the temporarily distorted elastic tube are shown in FIG. 5 and FIG. 6, respectively. In the pressed state the rib 5 formed on the inner surface of the tube 4 contacts the inner surfaces of the tube 4 to occlude passage of fluid through the tube 4. The passage in the tube 4 is doubly shut by the rib 5, since both a front part 5a and a rear part 5b of the rib 5 contribute to shut the passage independently.

In the embodiment described above, and as seen with reference to FIG. 7, two small hollows 8 and 9 may remain above and below the rib 5 at both bending corner sides of the tube 4. However, these hollows 8 and 9 do not cause any leakage of fluid. In this respect, hollows 8 or 9 communicate with either an upstream tube segment 10 or a downstream tube segment 11. For example, if the upper hollow 8 communicates with the upstream segment 10 in FIG. 7, the lower hollow 9 communicates with the down-stream segment 11. Hence, the upstream tube segment 10 and the downstream tube segment 11 do not communicate with each other in spite of the existence of the hollows 8 and 9 at the bending corners. The tube segments 10 and 11 are separated by both the front part 5a and the rear part 5b and of the rib 5.

FIGS. 8 and 9 show another embodiment of a pinch valve having an elastic tube 4' with a rib 5'. The rib 5' of the FIG. 8 embodiment comprises an essentially toroidal or ring portion 12 of circular cross-section and a thinner annular coupling portion 13 on the outer circumference of the portion 12. The coupling portion 13 connects the ring portion 12 to the inner surface of the elastic tube 4'. Inasmuch as the rib 5' of the FIG. 8 embodiment has more surface area in the internal passage of the tube 4' in its non-deformed state than does the rib 5 in the FIG. 4 embodiment, the rib 5' causes a slightly greater pressure loss in the open (non-deformed) state of valve than does the rib 5.

In the FIG. 8 embodiment the temporary distortion at both bending corner portions becomes still more facile to the extent that even a relatively weak force enables the pinch valve to secure perfect sealing. In its closed state a strong stress is not imposed on the bending corner sides of the elastic tube of the FIG. 8 embodiment, so that local and severe distortions are eliminated. Further, endurance of the valve is enhanced.

In another embodiment shown in FIG. 11, pressed portions 14 and 15 of an elastic tube 4" are shaped to be essentially flat. Projections 16 and 17 are formed to extend transversely away from the center of the press portions 14 and 15. The projections 16 and 17 are inserted into holes 18 and 19 perforated in the pressing members 6" and 7". The pinch valve of the FIG. 11 embodiment secures exact correspondence of the direction of the rib 5" and the direction of the pressing members 6" and 7", which heightens the sealing performance in the closed state of the valve.

The pinch valves according to any of the various embodiments of the invention can be used as a safety valve. FIG. 10 shows an example of such a safety valve. The safety valve of FIG. 10 comprises the elastic tube 4; the pressing members 6 and 7; a bracket 20 fitted on the outer surface of the elastic tube 4; a lever 21 pivotedly mounted on the bracket 20; a coupling plate 24 bridging both side plates 22 and 23 of the bracket 20; an adjustment screw 25 fitted on the coupling plate 24; and, a pressing spring 26 placed between the adjustment screw 25 and the lever 21. The pressing members 6 and 7 are fixed at the front ends of the lever 21 and the bracket 20, respectively.

In operation of the FIG. 10 embodiment, the pressing spring 26 pushes lever 21 downwardly, causing the pressing members 6 and 7 to press the outer surface of the elastic tube 4. Simultaneously the inner surface of the elastic tube 4 receives an expansion force generated by the static pressure of the fluid in the tube 4.

In a normal state, when the pressure of the fluid is less than the pressure exerted through the pressing members 6 and 7 from the pressing spring 26, the force of the spring 26 overcomes the force derived from the pressure of the fluid. In this state the passage in the tube 4 is fully choked.

When the pressure in the upstream tube segment 10 exceeds the pressure exerted by the pressing spring 26, the total force acting on the pressed portions 27 and 28 of the inner surface overcomes the elastic force of the pressing spring 26. Then the pressing members 6 and 7 are pushed outwardly so that the inner passage of the elastic tube 4 becomes open. Therefore the pinch valve functions as a safety valve.

Conventional safety valves, which comprise many metallic components, often suffer from various disorders. For example, conventional safety valves suffer from leakage caused by chemical or mechanical damages of the metallic valve base or valve body, or operational difficulties due to the adhesion of scales or the like to the valve shaft. The embodiments of the safety valve detailed above, however, have relative simple structure. Disorders, such as leakage, and operational difficulties, are lessened since components appearing in the fluid passage are made from rubber, synthetic rubber or plastics, which do not rust nor are corroded by chemical reactions. This is of great advantage in safety valves which are utilized in an apparatus or circuit for warm water.

The pinch valve of the foregoing embodiments can be used as a valve for manual operation. Moreover, these pinch valves can easily be utilized in automated operations such as, for example, a motor-valve in which a motor shuts or opens the valve. In this example, in addition to the aforementioned advantages, this invention realizes, a stable, durable, and facile motor-valve since the pinch valve has no screwed valve shaft enclosed by ground packings for sealing, which causes large friction loss of energy.

The embodiments of pinch valves described above, which comprise an elastic tube having a slant annular rib on its inner surface and a choking device for pressing the elastic tube at the portion where the rib is formed therein, can be applied to various uses as an expensive valve with high sealing performance.

Usually the elastic tube is made from rubber, synthetic rubber or plastics. Various kinds of fiber elements may be included to reinforce the elastic tube against the high inner pressures.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A pinch valve comprising:
   a hollow, compressible tubular member;
   annular rib formed on the inner walls of said tubular member, said annular rib lying in a plane oblique to a plane passing through the radial cross-section of said tubular member; and,
   choking means for selectively compressing said tubular member at a portion thereof where said annular rib is formed on said inner walls of said tubular member, whereby said tubular member is sufficiently compressed, portions of said tubular member immediately upstream and downstream of said annular rib engage opposed respective portions of said annular rib to prevent fluid flow through said tubular member.

2. The pinch valve of claim 1, wherein said annular rib is a circular toroid.

3. The pinch valve of claim 1, wherein said annular rib is an elliptical toroid.

4. The pinch valve of claim 1, wherein said rib is integral with said tubular member.

5. The pinch valve of claims 1 or 4, wherein said annular rib is connected to said tubular member by an annular coupling portion thinner than said annular rib.

6. The pinch valve of claim 1, wherein two opposing outer wall portions of said tubular member are flat, wherein said flat outer wall portions have projections extending perpendicularly therefrom, and wherein said choking means is adapted to engage said projections.

7. The pinch valve of claim 1, further comprising:
   bracket means fitted on an outer wall portion of said tubular member;

lever means having one end pivotally mounted on said bracket means and another end attached to said choking means; and, tensioning means coupled to said bracket means and adapted to bear on said lever means, thereby causing said choking means to compress said tubular member with a definite force.

8. The pinch valve of claim 1, wherein said tubular member comprises rubber.

9. The pinch valve of claim 1, wherein said tubular member comprises synthetic rubber.

10. The pinch valve of claim 1, wherein said tubular member comprises plastic.

11. The pinch valve of claim 1, wherein said tubular member comprises fiberous reinforcing elements.

12. The pinch valve of claim 1, wherein said tubular member is included in a circuit for handling warm water.

13. The pinch valve of claim 1 including tensioning means for urging said choking means into a position for fully choking flow through said tube at less than a predetermined pressure whereby fluid is permitted to flow through said tube when pressure therein exceeds said predetermined pressure.

* * * * *